US012586177B2

(12) United States Patent
Matsumoto

(10) Patent No.: US 12,586,177 B2
(45) Date of Patent: Mar. 24, 2026

(54) DAMAGE INFORMATION PROCESSING DEVICE, DAMAGE INFORMATION PROCESSING METHOD, AND PROGRAM

(71) Applicant: FUJIFILM Corporation, Tokyo (JP)

(72) Inventor: Kazuma Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 291 days.

(21) Appl. No.: 18/183,809

(22) Filed: Mar. 14, 2023

(65) Prior Publication Data

US 2023/0214992 A1      Jul. 6, 2023

Related U.S. Application Data

(63) Continuation of application No. PCT/JP2021/034967, filed on Sep. 24, 2021.

(30) Foreign Application Priority Data

Sep. 29, 2020    (JP) ................................. 2020-163228

(51) Int. Cl.
  *G06T 7/00*      (2017.01)
  *G06V 10/75*     (2022.01)
(52) U.S. Cl.
  CPC ............ *G06T 7/001* (2013.01); *G06V 10/751* (2022.01)
(58) Field of Classification Search
  CPC ........... G06T 7/001; G06T 2207/10016; G06T 2207/30132; G06T 7/0008; G06V 10/751;
    (Continued)

(56) References Cited

U.S. PATENT DOCUMENTS 9,152,863 B1 * 10/2015 Grant ..................... G06Q 10/20
10,269,187 B2   4/2019 Lin et al.
    (Continued)

FOREIGN PATENT DOCUMENTS

CN       102834839 A     12/2012
CN       108021990 A      5/2018
    (Continued)

OTHER PUBLICATIONS

An Office Action; "Notice of Reasons for Refusal," mailed by the Japanese Patent Office on Jan. 9, 2025, which corresponds to Japanese Patent Application No. 2024-099444 and is related to U.S. Appl. No. 18/183,809; with English language translation.
    (Continued)

*Primary Examiner* — Aaron W Carter
(74) *Attorney, Agent, or Firm* — Studebaker Brackett PLLC

(57)        ABSTRACT

Provided is a damage information processing device, a damage information processing method, and a program that offer ease with which a user can recognize a point that has a chronologically unnatural difference. A damage information processing device (10) includes a processor (20) and is configured to process information about damage to a structure. The processor (20) is configured to acquire information about damage to a structure. The information includes first damage information about a state at one point in time and second damage information about a state at a later point in time than the first damage information. The processor (20) is configured to extract difference information concerning the difference between the first damage information and the second damage information. The processor (20) is configured to detect, by searching through the difference information, a first category point where only the first damage information is involved or where the first damage informa-
    (Continued)

START

ACQUIRE DAMAGE INFORMATION A AND DAMAGE INFORMATION B ~ S10

EXTRACT DIFFERENCE INFORMATION ~ S11

DETECT FIRST CATEGORY POINT ~ S12

OUTPUT ALERT INDICATION TO DISPLAY UNIT ~ S13

END tion is greater than the second damage information. The processor (20) is configured to output, to a display device, an alert indication in connection with at least one of the first damage information or the second damage information to give an indication of the first category point.

14 Claims, 14 Drawing Sheets

(58) Field of Classification Search
CPC ........ G06V 20/00; G06Q 10/20; G06Q 10/00; G01N 21/88
See application file for complete search history.

(56) References Cited

U.S. PATENT DOCUMENTS

| | | | | |
|---|---|---|---|---|
| 10,452,915 | B1 * | 10/2019 | Chikkaveerappa ... | G06F 40/279 |
| 10,791,265 | B1 * | 9/2020 | Lambert ................ | G06V 10/24 |
| 11,130,477 | B2 * | 9/2021 | Watts .................... | G06Q 10/20 |
| 11,632,505 | B2 | 4/2023 | Zhu et al. | |
| 11,887,064 | B2 | 1/2024 | Kim et al. | |
| 2006/0065645 | A1 * | 3/2006 | Nakasu .................. | B23K 26/34 |
| | | | | 219/121.68 |
| 2011/0188734 | A1 * | 8/2011 | Tsuchiya .................. | G03F 1/84 |
| | | | | 382/149 |
| 2011/0313936 | A1 * | 12/2011 | Sieger .................. | G06Q 10/083 |
| | | | | 705/306 |
| 2013/0093781 | A1 | 4/2013 | Suzuki et al. | |
| 2013/0231769 | A1 * | 9/2013 | Tien ........................ | G06T 7/001 |
| | | | | 700/121 |
| 2015/0287130 | A1 * | 10/2015 | Vercollone .......... | G06V 10/235 |
| | | | | 705/34 |
| 2017/0084015 | A1 * | 3/2017 | Rhoades .............. | G06T 7/0002 |
| 2018/0189423 | A1 * | 7/2018 | Nonaka ........... | G06Q 10/06316 |
| 2018/0189750 | A1 * | 7/2018 | Nonaka ................. | G06T 7/0004 |
| 2018/0195973 | A1 | 7/2018 | Yonekawa et al. | |
| 2018/0292328 | A1 * | 10/2018 | Karube .............. | G01N 21/8851 |
| 2018/0293255 | A1 | 10/2018 | Karube | |
| 2018/0299387 | A1 | 10/2018 | Nonaka | |
| 2018/0300874 | A1 * | 10/2018 | Karube ................. | G06T 7/0006 |
| 2018/0308230 | A1 * | 10/2018 | Karube .................. | G01N 21/88 |
| 2019/0061972 | A1 * | 2/2019 | Gang ...................... | B64D 45/00 |
| 2020/0317165 | A1 * | 10/2020 | Watts ...................... | B21D 1/06 |
| 2020/0326540 | A1 * | 10/2020 | Sumigama ............. | H04N 23/00 |
| 2021/0216062 | A1 * | 7/2021 | Hsiao .............. | G05B 19/41865 |
| 2021/0270748 | A1 * | 9/2021 | Horita ................ | G01N 21/8803 |
| 2021/0272262 | A1 * | 9/2021 | Horita ................. | G01M 5/0008 |
| 2021/0281748 | A1 | 9/2021 | Nogami et al. | |
| 2021/0327040 | A1 * | 10/2021 | Kim ........................ | G06T 7/001 |
| 2021/0327042 | A1 * | 10/2021 | Kim .................... | G06F 18/2163 |
| 2021/0358102 | A1 | 11/2021 | Zhao et al. | |
| 2022/0114561 | A1 * | 4/2022 | Watts .................... | G06Q 10/20 |
| 2023/0026515 | A1 * | 1/2023 | Beavers .................. | H04N 7/15 |
| 2023/0214558 | A1 * | 7/2023 | Ozeki .................... | G06Q 50/10 |
| 2023/0214992 | A1 * | 7/2023 | Matsumoto .......... | G06T 7/0008 |
| | | | | 382/199 |
| 2023/0245296 | A1 * | 8/2023 | Horita .................. | G06T 7/0004 |
| | | | | 382/108 |
| 2023/0260098 | A1 * | 8/2023 | Horita .................... | G06Q 10/00 |
| | | | | 345/419 |
| 2023/0296531 | A1 * | 9/2023 | Matsumoto .......... | G06T 7/0004 |
| | | | | 356/237.1 |
| 2023/0298319 | A1 * | 9/2023 | Nyer ...................... | G06V 20/59 |
| | | | | 382/103 |
| 2023/0321687 | A1 * | 10/2023 | Arthur .................. | B05D 5/005 |
| | | | | 427/140 |
| 2024/0078660 | A1 * | 3/2024 | Furukawa ................. | G06T 7/74 |
| 2024/0219312 | A1 * | 7/2024 | Horita .................... | G06V 10/86 |

FOREIGN PATENT DOCUMENTS

| | | |
|---|---|---|
| JP | 2007-026255 A | 2/2007 |
| JP | 2019-020220 A | 2/2019 |
| JP | 6507268 B2 | 4/2019 |
| JP | 2019-070631 A | 5/2019 |
| JP | 2019-211277 A | 12/2019 |
| JP | 6749528 B1 | 9/2020 |
| KR | 102097120 B1 | 4/2020 |
| WO | 2017/014288 A1 | 1/2017 |
| WO | 2017/051633 A1 | 3/2017 |
| WO | 2018/037689 A1 | 3/2018 |
| WO | 2020/110576 A1 | 6/2020 |
| WO | 2020-110676 A1 | 6/2020 |

OTHER PUBLICATIONS

International Search Report issued in PCT/JP2021/034967; mailed Dec. 21, 2021.

International Preliminary Report on Patentability (Chapter I) and Written Opinion of the International Searching Authority issued in PCT/JP2021/034967; issued Mar. 28, 2023.

The extended European search report issued by the European Patent Office on Mar. 5, 2024, which corresponds to European Patent Application No. 21875387.9-1218 and is related to U.S. Appl. No. 18/183,809.

An Office Action; "Decision of Refusal," mailed by the Japanese Patent Office on Mar. 18, 2025, which corresponds to Japanese Patent Application No. 2024-099444 and is related to U.S. Appl. No. 18/183,809; with English language translation.

Office Action issued in CN 202180064991.8; mailed by the State Intellectual Property Office of the People's Republic of China on Nov. 28, 2025.

An Office Action, "Notice of Reasons for Refusal," mailed by the Japanese Patent Office on Feb. 18, 2026, which corresponds to Japanese Patent Application No. 2025-098637 and is related to U.S. Appl. No. 18/183,809; with English language translation.

* cited by examiner

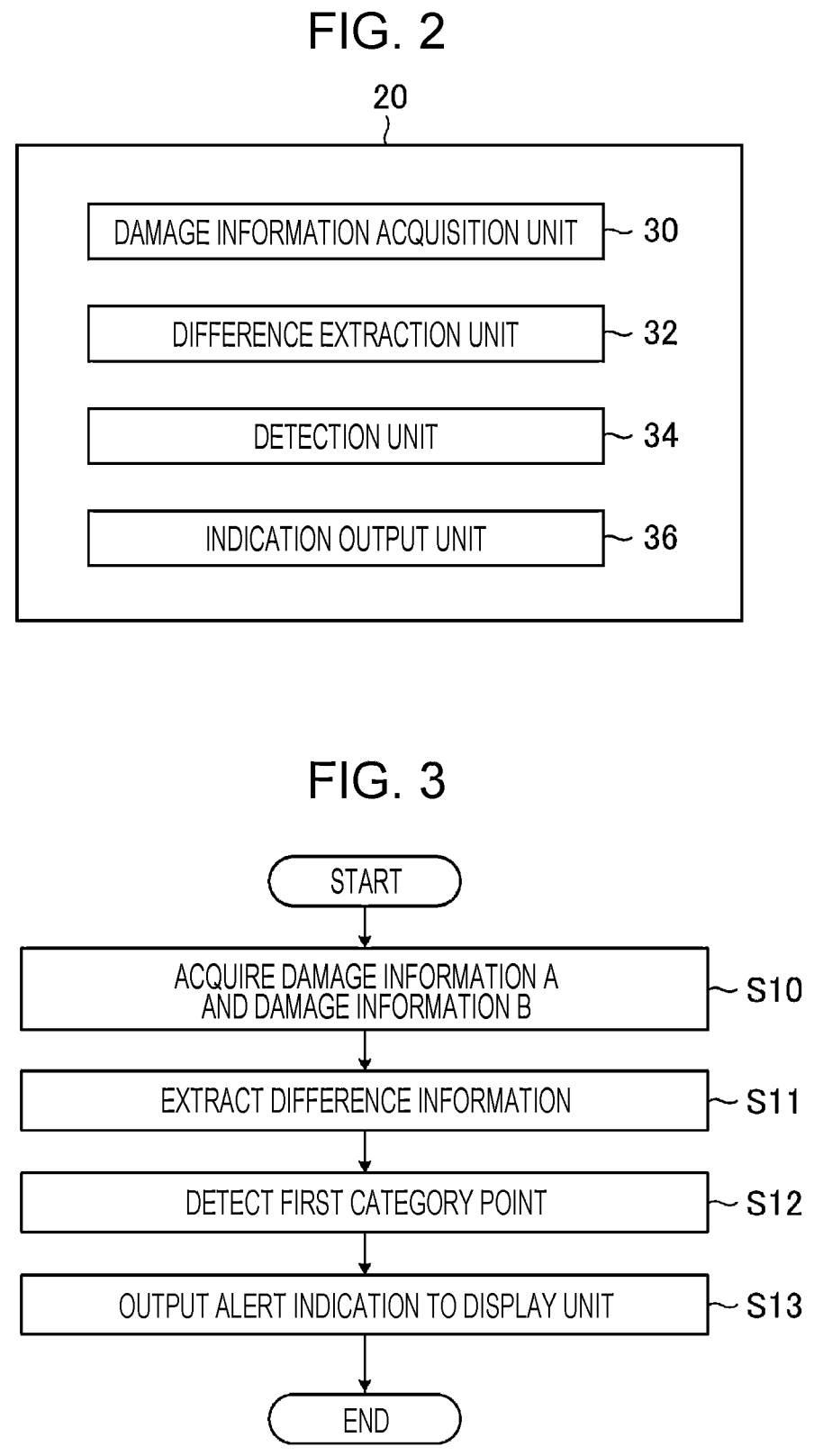

```
┌─────────────────────────────────────────────────────┐
│                                                       │
│   ┌─────────────────────────────────────────┐         │
│   │ DAMAGE INFORMATION ACQUISITION UNIT      │~ 30     │
│   └─────────────────────────────────────────┘         │
│                                                       │
│   ┌─────────────────────────────────────────┐         │
│   │     DIFFERENCE EXTRACTION UNIT           │~ 32     │
│   └─────────────────────────────────────────┘         │
│                                                       │
│   ┌─────────────────────────────────────────┐         │
│   │          DETECTION UNIT                  │~ 34     │
│   └─────────────────────────────────────────┘         │
│                                                       │
│   ┌─────────────────────────────────────────┐         │
│   │       INDICATION OUTPUT UNIT             │~ 36     │
│   └─────────────────────────────────────────┘         │
│                                                       │
└─────────────────────────────────────────────────────┘
```

FIG. 3

```
                ( START )
                    │
                    ▼
   ┌─────────────────────────────────────────┐
   │   ACQUIRE DAMAGE INFORMATION A           │~ S10
   │   AND DAMAGE INFORMATION B               │
   └─────────────────────────────────────────┘
                    │
                    ▼
   ┌─────────────────────────────────────────┐
   │     EXTRACT DIFFERENCE INFORMATION       │~ S11
   └─────────────────────────────────────────┘
                    │
                    ▼
   ┌─────────────────────────────────────────┐
   │      DETECT FIRST CATEGORY POINT         │~ S12
   └─────────────────────────────────────────┘
                    │
                    ▼
   ┌─────────────────────────────────────────┐
   │   OUTPUT ALERT INDICATION TO DISPLAY UNIT │~ S13
   └─────────────────────────────────────────┘
                    │
                    ▼
                 ( END )
```

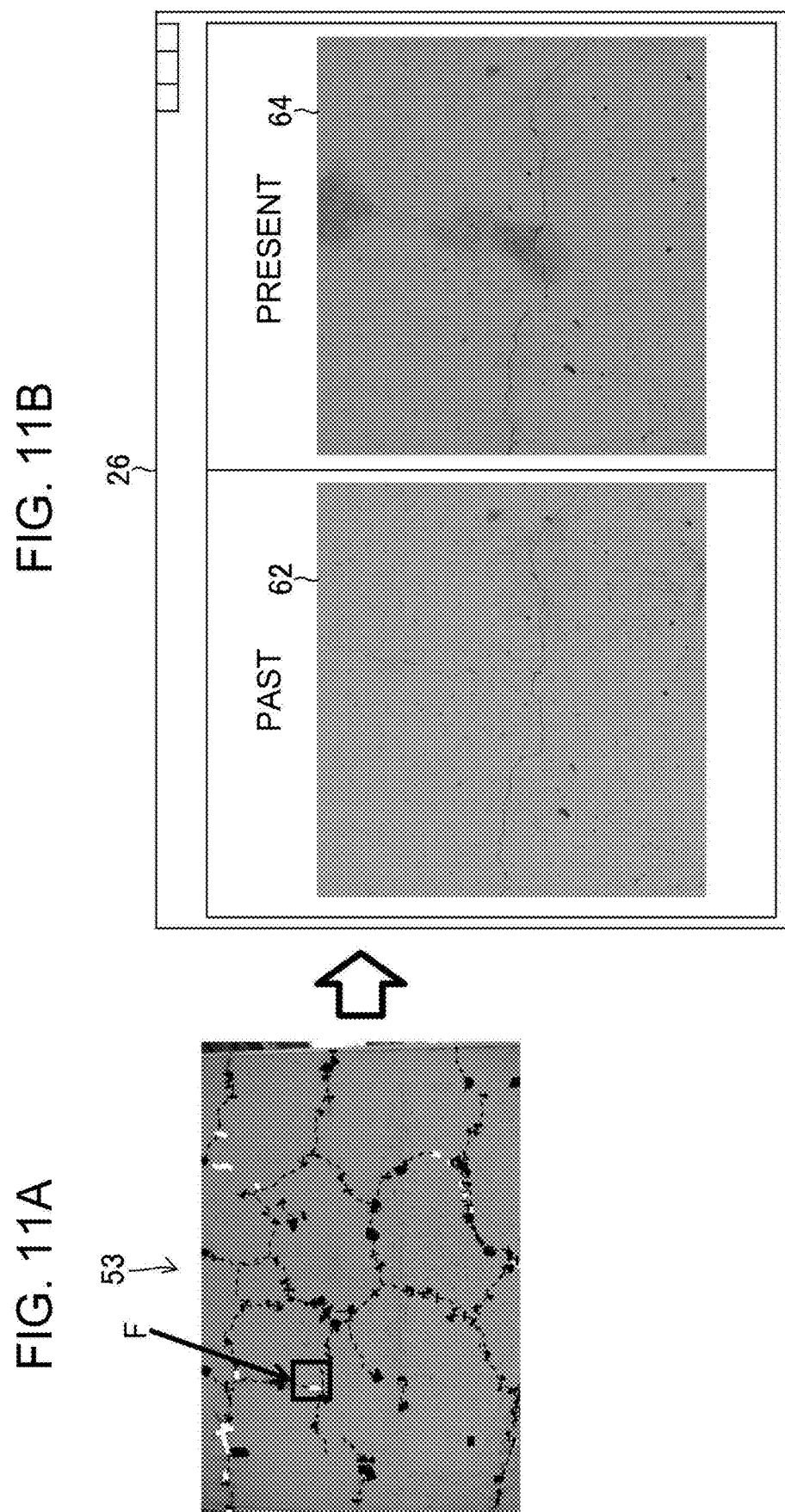

FIG. 15

DAMAGE INFORMATION PROCESSING DEVICE, DAMAGE INFORMATION PROCESSING METHOD, AND PROGRAM

CROSS-REFERENCE TO RELATED APPLICATIONS

The present application is a Continuation of PCT International Application No. PCT/JP2021/034967 filed on Sep. 24, 2021 claiming priority under 35 U.S.C § 119(a) to Japanese Patent Application No. 2020-163228 filed on Sep. 29, 2020. Each of the above applications is hereby expressly incorporated by reference, in its entirety, into the present application.

BACKGROUND OF THE INVENTION

1. Field of the Invention

The present invention relates to a damage information processing device, a damage information processing method, and a program and, more specifically, to a device configured to process information about damage to a structure, a method for processing information about damage to a structure, and a program that is to be executed to process information about damage to a structure.

2. Description of the Related Art

Structures can sustain damage due to, for example, deterioration over time. Thus, such a structure typically undergoes periodic inspections for damage. It is desired to conduct periodic inspections to determine the amount of increase in damage by comparing the result of a previous inspection with the result of a current inspection, and studies have been conducted to devise techniques for assisting in such a comparison.

JP2019-211277A describes a technique for determining any change in a crack in its length and width directions by acquiring and comparing two pieces of visual imagery acquired at different points in time to capture changes in the state of the same crack.

SUMMARY OF THE INVENTION

The amount of increase in damage may be determined by extracting the difference in result between inspections conducted at two different points in time. For various reasons, a chronologically unnatural difference can be extracted. For example, the extracted difference is considered unnatural when the damage identified in a previous inspection has not been mended but is not found in the current inspection conducted in the point where the damage was located in the previous inspection. In another example, the extracted difference is considered unnatural when a negative quantitative change in the damage has taken place or, more specifically, when the length, width, or area of the damage is smaller in the current inspection than in the previous inspection despite that the damage has not been mended. In other words, a chronologically unnatural difference is indicative of a change that conflicts with a chronologically irreversible transformation.

Possible reasons why such a chronologically unnatural difference is output include: differences in inspection conditions (e.g., who performed the inspection, the equipment used in the inspection, and the environment) between the previous inspection and the current inspection; defects in visual imagery of the subject of inspection; and deficiencies in the extraction of damage from the visual imagery.

It is thus required that the point where the chronologically unnatural difference has arisen be recognized by the person who conducted the inspection (i.e., the user), and the chronologically unnatural difference needs to be remedied by, for example, revising the inspection conditions, reacquiring visual imagery, or redoing the damage extraction. No mention of such a chronologically unnatural difference is made in JP2019-211277A described above.

The present invention therefore has been made in view of such circumstances, and it is an object of the present invention to provide a damage information processing device, a damage information processing method, and a program that offer ease with which a user can recognize a point that has a chronologically unnatural difference.

To attain the aforementioned object, an aspect of the present invention is directed to a damage information processing device including a processor and configured to process information about damage to a structure. The processor is configured to acquire information about damage to a structure. The information includes first damage information about a state at one point in time and second damage information about a state at a later point in time than the first damage information. The processor is configured to extract difference information concerning the difference between the first damage information and the second damage information. The processor is configured to detect, by searching through the difference information, a first category point where only the first damage information is involved or where the first damage information is greater than the second damage information. The processor is configured to output, to a display device, an alert indication in connection with at least one of the first damage information or the second damage information to give an indication of the first category point.

The following features are derived from the aspect of the present invention. The difference information concerning the difference between the first damage information and the second damage information is extracted, and the difference information is searched for a first category point where only the first damage information is involved. The difference information is also searched for a first category point where the first damage information is greater than the second damage information. The first category point is a point where only the first damage information about a state at an earlier point in time is involved or where the first damage information is greater than the second damage information; that is, the first category point is the point that has the difference information that is chronologically unnatural. Upon receipt of the alert indication that is output in connection with at least one of the first damage information or the second damage information to give an indication of the first category point, the display device displays the alert indication. The aspect of the present invention thus offers ease with which the user can recognize the first category point.

The processor preferably detects, by searching through the difference information, a second category point where only the second damage information is involved or where the second damage information is greater than the first damage information. Then, the processor preferably outputs, to the display device, an alert indication in connection with at least one of the first damage information or the second damage information to give an indication of the second category point.

With reference to the difference information, the first damage information, and the second damage information, the processor preferably detects a third category point where the first damage information and the second damage information overlap each other or where the first damage information and the second damage information are identical to each other. Then, the processor preferably outputs, to the display device, an alert indication in connection with at least one of the first damage information or the second damage information to give an indication of the third category point.

The processor preferably causes the display device to switch between displaying and hiding an indication associated with damage information corresponding to the first category point, an indication associated with damage information corresponding to the second category point, or an indication associated with damage information corresponding to the third category point.

The processor preferably indicates the second category point in various forms in accordance with the magnitude of difference included in the difference information.

The processor preferably performs display processing in which the processor causes the display device to display an indication associated with information obtained by superposing the first damage information and the second damage information.

The processor preferably acquires first visual imagery from which the first damage information is obtained and second visual imagery from which the second damage information is obtained. Then, the processor preferably performs display processing in which the processor causes the display device to display the first visual imagery and the second visual imagery side by side.

When the first visual imagery or the second visual imagery does not meet a predetermined requirement, the processor preferably performs display processing in which the processor causes the display device to display an indication prompting a user to reacquire visual imagery.

The processor preferably outputs, to the display device, one or more procedures for making corrections to the first damage information corresponding to the first category point or for making corrections to the second damage information corresponding to the first category point.

The processor preferably accepts correction information concerning corrections made to the first damage information or the second damage information displayed by the display device. Then, the processor preferably extracts the difference information again with reference to the first damage information or the second damage information to which the corrections are made.

The processor preferably automatically makes corrections to the first damage information corresponding to the first category point or to the second damage information corresponding to the first category point.

Another aspect of the present invention is directed to a damage information processing method by which a damage information processing device including a processor processes information about damage to a structure. The method includes the steps of: causing the processor to acquire information about damage to a structure, the information including first damage information about a state at one point in time and second damage information about a state at a later point in time than the first damage information; causing the processor to extract difference information concerning difference between the first damage information and the second damage information; causing the processor to detect, by searching through the difference information, a first category point where only the first damage information is involved or where the first damage information is greater than the second damage information; and causing the processor to output, to a display device, an alert indication in connection with at least one of the first damage information or the second damage information to give an indication of the first category point.

Still another aspect of the present invention is directed to a program by which a damage information processing device including a processor and configured to process information about damage to a structure is caused to execute a damage information processing method. The program causes the processor to perform the steps of: acquiring information about damage to a structure, the information including first damage information about a state at one point in time and second damage information about a state at a later point in time than the first damage information; extracting difference information concerning difference between the first damage information and the second damage information; detecting, by searching through the difference information, a first category point where only the first damage information is involved or where the first damage information is greater than the second damage information; and outputting, to a display device, an alert indication in connection with at least one of the first damage information or the second damage information to give an indication of the first category point.

BRIEF DESCRIPTION OF THE DRAWINGS

FIG. 2 is a block diagram illustrating the functionality included in a CPU;

FIG. 3 is a flowchart of a procedure by which the damage information processing device provides an indication;

FIGS. 5A and 5B illustrate the acquisition of damage information B by the damage information acquisition unit;

FIGS. 11A and 11B each illustrate an example form of display in a modification;

FIG. 15 illustrates a state in which a damage view in another modification is displayed by the display unit.

DESCRIPTION OF THE PREFERRED EMBODIMENTS

Preferred embodiments of the present invention related to a damage information processing device, a damage information processing method, and a program will be described below with reference to the accompanying drawings.

Figure 1:
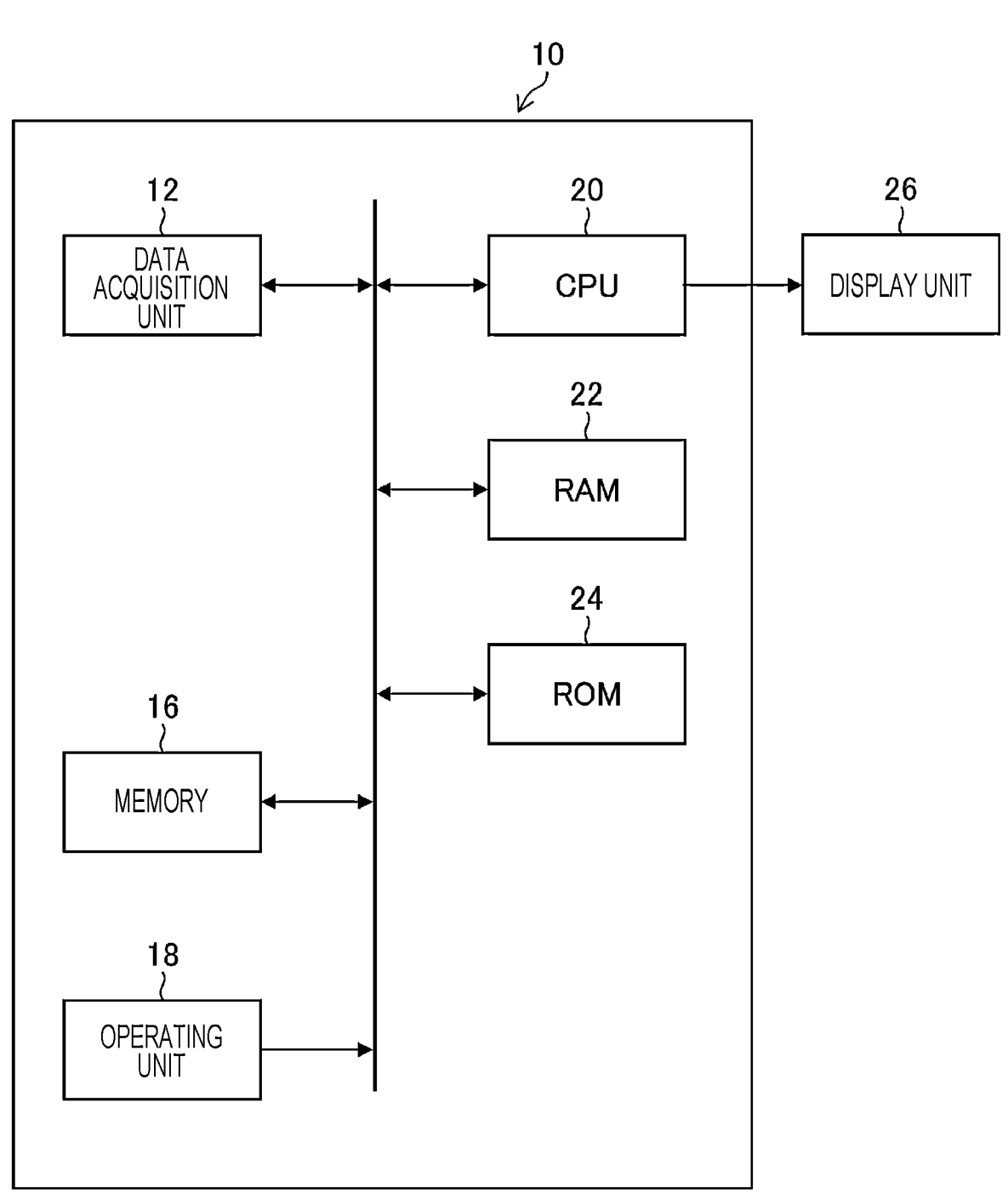
FIG. 1 is a block diagram illustrating an example hardware configuration of a damage information processing device.

FIG. 1 is a block diagram illustrating an example hardware configuration of a damage information processing device 10.

The damage information processing device 10 is, for example, a computer or a workstation. The hardware configuration of the damage information processing device 10 includes mainly a data acquisition unit 12, a memory 16, an operating unit 18, a central processing unit (CPU) (processor) 20, a random access memory (RAM) 22, and a read-only memory (ROM) 24. The damage information processing device 10 outputs a display image to a display unit (display device) 26. The display unit 26 is included in a client terminal that is connected to a client server system via a network. The damage information processing device 10 serves as a server that responds to a request from the client terminal. The display image output by the damage information processing device 10 is thus displayed by the display unit 26. In some embodiments, the damage information processing device 10 is incorporated in a computer, and the display unit 26 is a monitor connected to the computer.

The data acquisition unit 12 is an input unit that receives input of data. For example, the data acquisition unit 12 acquires information (data) stored in the memory 16. The information may be acquired by the data acquisition unit 12 before being stored in the memory 16, or the information may be prestored in the memory 16. For example, the data acquisition unit 12 acquires visual imagery of the subject of inspection and damage information, both of which will be described later.

The memory 16 serves as a database. After being acquired by the data acquisition unit 12, the visual imagery of the subject of inspection and the damage information are stored in the memory 16. For example, visual imagery of a structure undergoing periodic inspections and visual imagery of damage to the structure are cumulatively stored in the memory 16 as results of the inspections. Constructions such as civil engineering structures and architectural structures can be subjects of inspections. Examples of civil engineering structures include bridges, tunnels, and dams. Examples of architectural structures include buildings, houses as well as walls, pillars, and beams of structures. Inspections of structures are conducted to detect damage such as cracking, peeling, exposure of reinforcing iron bars, water leakage, free lime, and corrosion.

The operating unit 18 is a keyboard or a pointing device, such as a mouse. Commands entered by the user are input to the damage information processing device 10 by way of the operating unit 18.

The CPU 20 performs its function by executing a program stored in the memory 16 or the ROM 24 after loading the program into the RAM 22.

FIG. 2 is a block diagram illustrating the functionality included in the CPU 20.

The CPU 20 includes a damage information acquisition unit 30, a difference extraction unit 32, a detection unit 34, and an indication output unit 36.

The damage information acquisition unit 30 acquires damage information. The term "damage information" refers to information about damage to a structure that is the subject of inspections. The damage information may be in various forms. Examples of the damage information include vectorial information about damage (cracking) and information about the region of damage (peeling, exposure of reinforcing iron bars, water leakage, free lime, or corrosion).

The damage information acquisition unit 30 acquires two kinds of damage information concerning the same damage and obtained at different points in time. For example, the damage information acquisition unit 30 acquires damage information obtained at periodic inspections and stored in the memory 16. More specifically, the damage information acquisition unit 30 acquires damage information A (first damage information) and damage information B (second damage information), which are relevant to the same damage and acquired at a time a and a time b, respectively. The time a is prior to the time b. For example, the time a is August 2015, and the time b is August 2020. Although it is required that a and b denote different points in time, the time a and the time b are not limited to particular points in time.

The difference extraction unit 32 extracts the difference between the damage information A and the damage information B. The difference is herein referred to as difference information. As the difference information, points of difference between the damage information A and the damage information B are extracted by the difference extraction unit 32. For example, the damage information A and the damage information B are in the form of vectorial information concerning the same crack, in which case points of difference between the damage information A and the damage information B are extracted as the difference information. Alternatively, the damage information A and the damage information B may be in the form of areal measurements of the same region of peeling. In this case as well, points of difference between the damage information A and the damage information B are extracted as the difference information. The difference extraction unit 32 may extract difference information concerning the difference in quantitative values (the length, width and/or area) between the damage information A and the damage information B. For example, the damage information A and the damage information B have information about the width of a crack, in which case the difference in the width of the crack is extracted as the difference information.

The detection unit 34 detects, by searching through the difference information, a first category point that has a chronologically unnatural difference. Only one of the two kinds of difference information or, more specifically, only the damage information A is involved in the first category point. In a case where the damage information is in the form of quantitative values, the first category point is a point where the damage information A is greater than the damage information B in terms of the quantitative value. If a point of interest in the damage information A is absent in the damage information B despite that the damage information A was obtained prior to the damage information B, the point is regarded as being chronologically unnatural. If the quantitative value of a point of interest is greater in the damage information A than in the damage information B despite that the damage information A was obtained prior to the damage information B, the point is regarded as being chronologically unnatural. The damage information A and the damage information B are premised on the idea that the detected damage has not been mended (or remains unrepaired).

The detection unit 34 detects, by searching through the difference information, a second category point that is the location of an increase in damage or the location of the occurrence of damage. Only one of the two kinds of difference information or, more specifically, only the damage information B is involved in the second category point. In the case where the damage information is in the form of quantitative values, the second category point is a point where the damage information B is greater than the damage information A in terms of the quantitative value. In a case where the acquisition of the damage information A at the time a precedes the increase in damage or the occurrence of damage, the damage information concerning the damage is incorporated into the damage information B only.

The detection unit 34 detects a third category point with reference to the damage information A, the damage information B, and the difference information. The third category point is an overlap between the damage information A and the damage information B. In the case where the damage information is provided in the form of quantitative values, with reference to the damage information A, the damage information B, and the difference information, the detection unit 34 detects a third category point where the damage information A and the damage information B are identical to each other. The third category point is the location where there has been no noticeable change in the damage between the instant when the damage information A was acquired and the instant when the damage information B was acquired.

The detection unit 34 detects the second category point and the third category point as necessary (in accordance with, for example, settings made by the user). The detection unit 34 may detect the first category point only, may detect the first category point and the second category point, may detect the first category point and the third category point, or may detect the first category point, the second category point, and the third category point.

The indication output unit 36 outputs a display image that is to be displayed by the display unit 26. The indication output unit 36 outputs the damage information A and the damage information B to perform display processing for causing the display unit 26 to display the damage information A and the damage information B. For example, the indication output unit 36 causes the display unit 26 to superimpose the damage information A and the damage information B and to display the resultant information. The indication output unit 36 provides an alert indication in connection with the displayed damage information (at least one of the damage information A or the damage information B) to give an indication of the first category point and outputs the alert indication to the display unit 26 such that the display unit 26 displays the alert indication. When the alert indication for giving an indication of the first category point is output to the display unit 26 and is displayed by the display unit 26, the user can be informed about the first category point and can thus easily recognize the first category point.

The indication output unit 36 provides an alert indication in connection with the displayed damage information (at least one of the damage information A or the damage information B) to give an indication of the second category point and outputs the alert indication to the display unit 26 such that the display unit 26 displays the alert indication. When the alert indication for giving an indication of the second category point is output to the display unit 26 and is displayed by the display unit 26, the user can be informed about the second category point and can thus easily recognize the increase in damage or the occurrence of damage.

The indication output unit 36 provides an alert indication in connection with the displayed damage information (at least one of the damage information A or the damage information B) to give an indication of the third category point and outputs the alert indication to the display unit 26 such that the display unit 26 displays the alert indication. When the alert indication for giving an indication of the third category point is output to the display unit 26 and is displayed by the display unit 26, the user can be informed about the third category point and can conduct inspection with greater accuracy.

The following describes a procedure by which the damage information processing device 10 processes the damage information. FIG. 3 is a flowchart of a procedure by which the damage information processing device 10 provides an indication.

The damage information processing device 10 or, more specifically, the damage information acquisition unit 30 acquires the damage information A and the damage information B (Step S10: damage information acquisition step). Then, the damage information processing device 10 or, more specifically, the difference extraction unit 32 extracts difference information concerning the difference between the damage information A and the damage information B (Step S11: difference information extraction step). Subsequently, the damage information processing device 10 or, more specifically, the detection unit 34 searches through the difference information to detect the first category point (Step S12: detection step). The detection unit 34 searches through the difference information to detect the second category point and/or the third category point if the detection unit 34 is preset by the user to do so. The damage information processing device 10 or, more specifically, the indication output unit 36 outputs an alert indication to the display unit 26 to give an indication of the first category point (Step S13: indication step). Likewise, the indication output unit 36 outputs an alert indication to the display unit 26 to give an indication of the second category point and/or an indication of the third category point.

These steps will be described one by one in detail below.

Damage Information Acquisition Step

The damage information acquisition step is performed by the damage information acquisition unit 30. The damage information acquisition unit 30 may acquire damage information or may generate and acquire damage information by extracting damage from an input image. The following describes a case in which the damage information acquisition unit 30 acquires damage information by extracting damage from visual imagery input to the damage information acquisition unit 30.

Figures 4A, 4B:
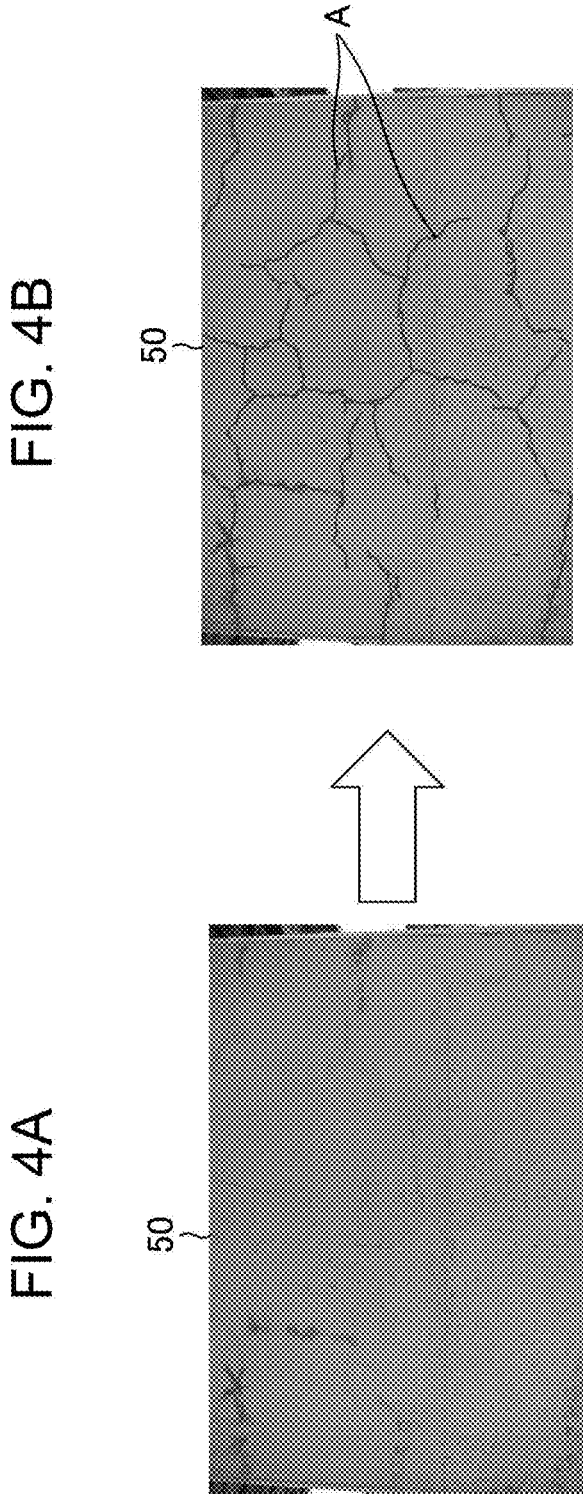
FIGS. 4A and 4B illustrate the acquisition of damage information A by a damage information acquisition unit.

FIGS. 4A and 4B illustrate the acquisition of the damage information A by the damage information acquisition unit 30.

FIG. 4A is visual imagery (first visual imagery) acquired by the damage information acquisition unit 30. The visual imagery is denoted by 50. The damage information acquisition unit 30 acquires the visual imagery 50 captured at the time a. A bridge pier C is seen in the visual imagery 50. The damage information acquisition unit 30 then extracts cracks from the visual imagery 50 by using various techniques. For example, the damage information acquisition unit 30 extracts cracks from the visual imagery 50 by image processing or by using a detector trained by machine learning. The damage information acquisition unit 30 acquires the damage information A (vectorial information) accordingly.

FIG. 4B illustrates the damage information A acquired by the damage information acquisition unit 30. The damage information A is vectorial information, and FIG. 4B is a damage view created on the basis of the vectorial information. The damage information acquisition unit 30 generates and acquires the damage information A by extracting cracks seen in the visual imagery 50. The damage information A is vectorial information and has information about the positions of the cracks in the visual imagery 50 and the information about the width and length of each crack.

Figures 5A, 5B:
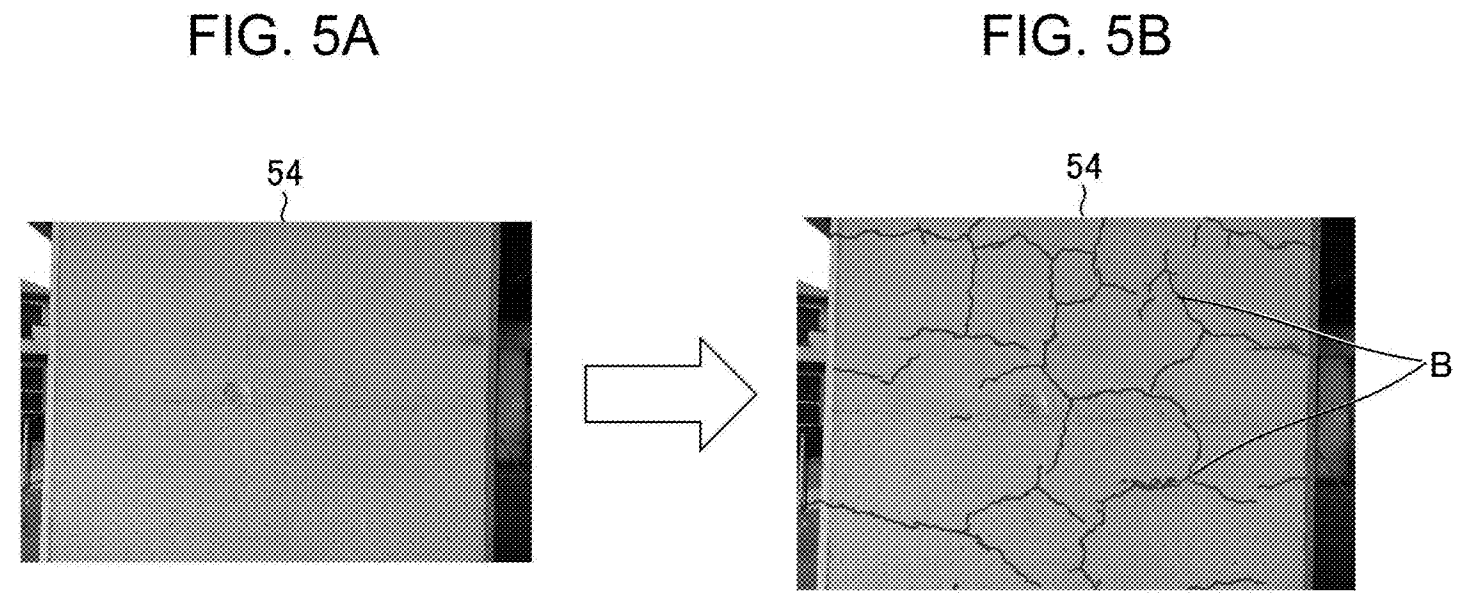

FIGS. 5A and 5B illustrate the acquisition of the damage information B by the damage information acquisition unit 30.

FIG. 5A is visual imagery (second visual imagery) acquired by the damage information acquisition unit 30. The visual imagery is denoted by 54. The damage information acquisition unit 30 acquires the visual imagery 54 captured at the time b. The bridge pier C is seen in the visual imagery 54. The damage information acquisition unit 30 then extracts cracks from the visual imagery 54 by using various techniques. For example, the damage information acquisition unit 30 extracts cracks from the visual imagery 54 by image processing or by using a detector trained by machine learning. The damage information acquisition unit 30 acquires the damage information B (vectorial information) accordingly.

FIG. 5B illustrates the damage information B acquired by the damage information acquisition unit 30. The damage information B is vectorial information, and FIG. 5B is a damage view created on the basis of the vectorial information. The damage information acquisition unit 30 generates and acquires the damage information B by extracting cracks seen in the visual imagery 54. The damage information B is vectorial information and has information about the positions of the cracks in the visual imagery 54 and the information about the width and length of each crack.

When the visual imagery 50 and the visual imagery 54 are deemed unsuitable for the acquisition of damage information after being input, that is, when the visual imagery 50 and the visual imagery 54 do not meet a predetermined requirement, the indication output unit 36 may output, to the display unit 26, an indication prompting the user to reacquire visual imagery, and the display unit 26 may in turn display the indication. In response to the prompt, the user can input visual imagery once again after reacquisition.

As described above, the damage information acquisition step is the step in which the damage information acquisition unit 30 acquires the damage information A and the damage information B.

Difference Information Extraction Step

The difference information extraction step is performed by the difference extraction unit 32. The difference extraction unit 32 extracts the difference between the damage information A and the damage information B by using various techniques. The following describes examples of the procedure by which the difference extraction unit 32 extracts difference information.

EXAMPLE 1

In Example 1, the difference extraction unit 32 uses image features to align the damage information A and the damage information B with each other and to extract difference information concerning the difference between the damage information A and the damage information B. As mentioned above, the damage information acquisition unit 30 obtains the visual imagery 50 to acquire the damage information A and obtains the visual imagery 54 to acquire the damage information B. In this case, the difference extraction unit 32 aligns the visual imagery 50 and the visual imagery 54 with each other and then aligns, on the basis of the information about the alignment, the damage information A and the damage information B with each other.

Figure 6:
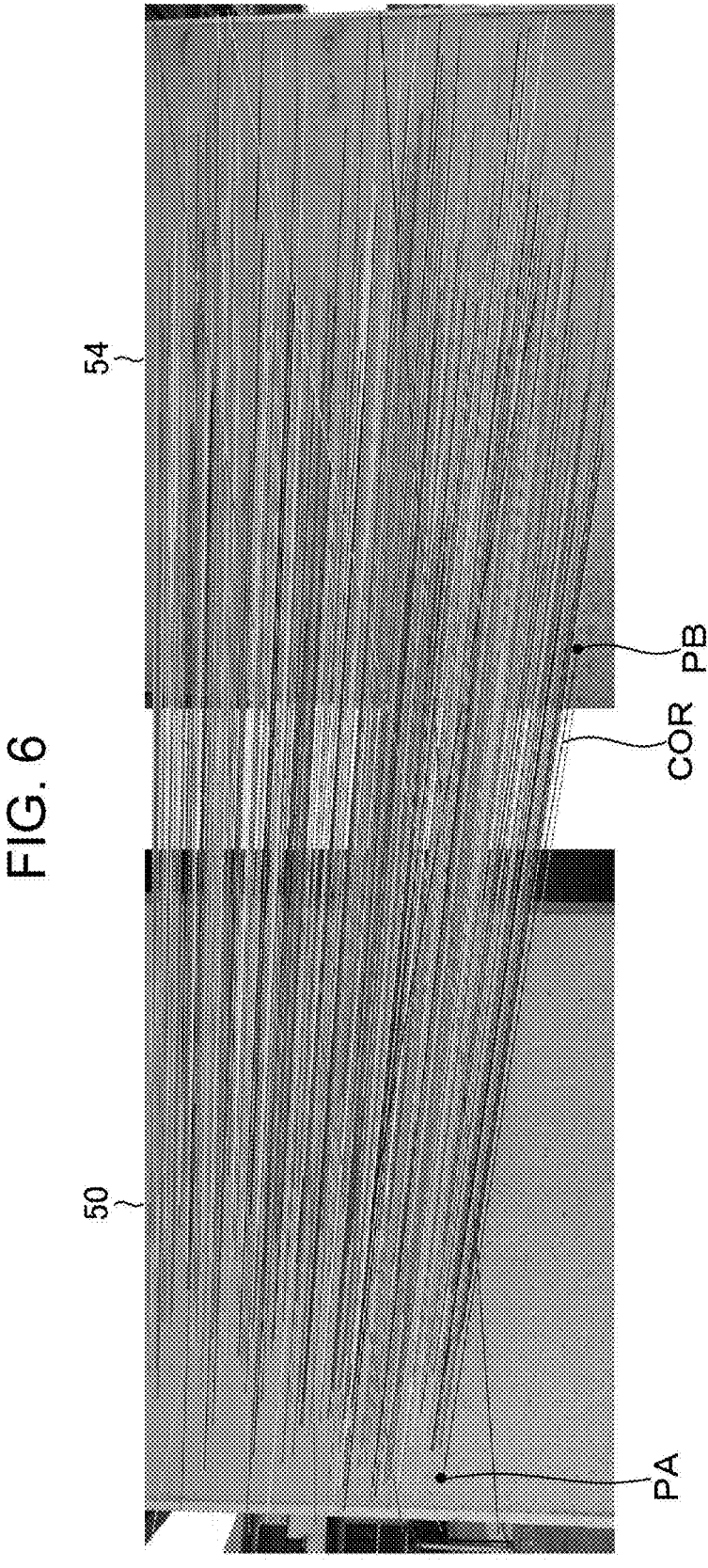
FIG. 6 illustrates how visual imagery is aligned with another with reference to feature points in the visual imagery.

FIG. 6 illustrates how the visual imagery 50 and the visual imagery 54 are aligned with each other with reference to feature points in the visual imagery 50 and feature points in the visual imagery 54.

First, the difference extraction unit 32 extracts feature points in the visual imagery 50 and feature points in the visual imagery 54. For example, the difference extraction unit 32 uses a feature point detection technique such as Oriented FAST and Rotated BRIEF (ORB) or ACCELER-ATED-KAZE (AKAZE) to extract feature points in the visual imagery 50 and feature points in the visual imagery 54. PA in FIG. 6 denotes one of the extracted feature points in the visual imagery 50. PB in FIG. 6 denotes one of the extracted feature points in the visual imagery 54.

The difference extraction unit 32 then derives feature points that are correspondences between the visual imagery 50 and the visual imagery 54. For example, the difference extraction unit 32 uses Brute-Force and Fast Library for Approximate Nearest Neighbors (FLANN) to derive correspondence points representing the correspondence between the visual imagery 50 and the visual imagery 54. A straight line COR in FIG. 6 denotes the correspondence between the feature point PA and the feature point PB.

As mentioned above, the difference extraction unit 32 derives the correspondences between feature points in the visual imagery 50 and feature points in the visual imagery 54; that is, the difference extraction unit 32 detects correspondence points. Subsequently, the difference extraction unit 32 aligns the visual imagery 50 and the visual imagery 54 with each other by using the detected correspondence points. More specifically, the correspondence between the visual imagery 50 and the visual imagery 54 is used to generate a coordinate transformation model (coordinate transformation matrix) for the coordinates on the visual imagery 50 and the coordinates on the visual imagery 54. The difference extraction unit 32 then aligns the damage information A and the damage information B with each other by using the coordinate transformation model and extracts the difference between the damage information A and the damage information B aligned with each other.

EXAMPLE 2

In Example 2, the difference extraction unit 32 uses a dynamic programming (DP) matching method to align the damage information A and the damage information B with each other and to extract difference information concerning the difference between the damage information A and the damage information B. The alignment procedure based on DP matching is well suited to extracting the difference from the damage information about cracks.

Figure 7:
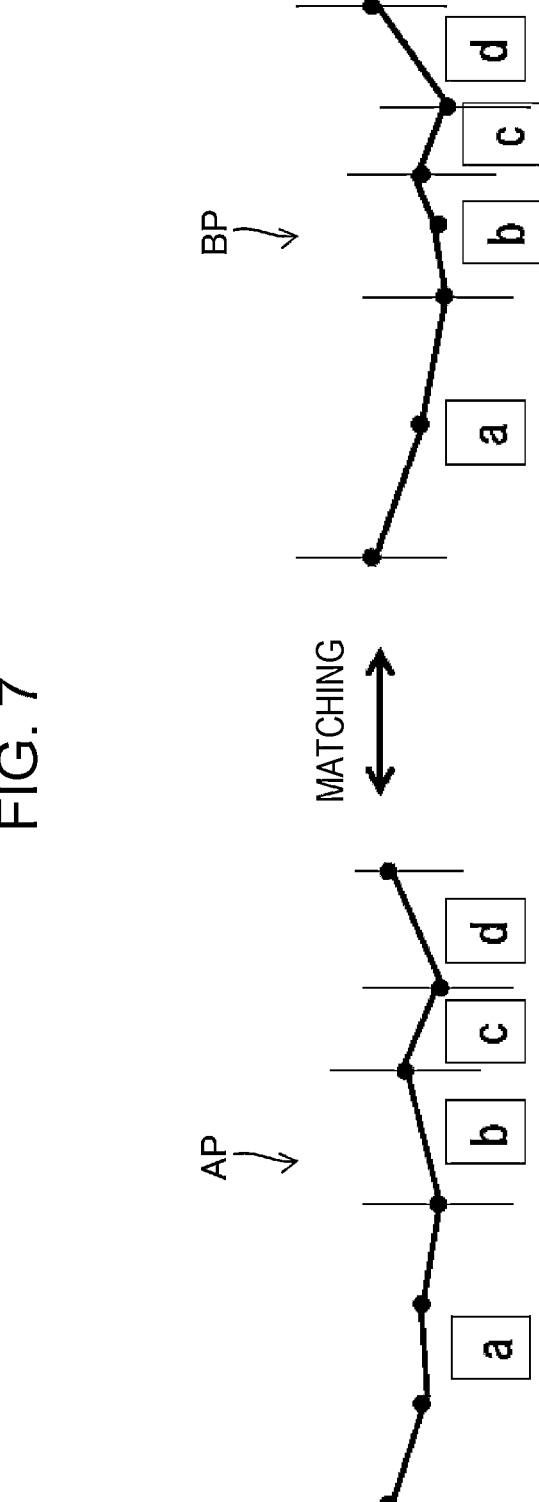
FIG. 7 illustrates how the difference in damage information is extracted through the use of DP matching.

FIG. 7 illustrates how the difference in the damage information is extracted through the use of DP matching.

The states of the same crack at two different points in time are represented by damage information AP and damage information BP. The damage information AP and the damage information BP may be regarded as vectorial information about the crack. The difference extraction unit 32 uses DP matching to derive correspondence spots a to d, which denote correspondence between the damage information AP and the damage information BP. For each of the correspondence spots a to d, the difference extraction unit 32 extracts difference information concerning the difference between the damage information AP and the damage information BP.

EXAMPLE 3

In Example 3, the difference extraction unit 32 uses artificial intelligence (AI) to align the damage information A and the damage information B with each other and to extract difference information concerning the difference between the damage information A and the damage information B. For example, the difference extraction unit 32 aligns the visual imagery 50 and the visual imagery 54 with each other by using a deep learning-based (deep learning-derived) recognizer configured to align an image with another image. After obtaining the positional information of the visual imagery 50 and the visual imagery 54 aligned with each other, the difference extraction unit 32 aligns the damage information A and the damage information B with each other on the basis of the positional information to extract difference information.

As described above, the difference extraction unit 32 may use various techniques to align the damage information A and the damage information B with each other. After aligning the damage information A and the damage information B with each other, the difference extraction unit 32 extracts the difference between the damage information A and the damage information B.

Detection Step

The detection step is performed by the detection unit 34. The detection unit 34 detects, by searching through the difference information, a first category point that has only the damage information A or where the damage information A is greater than the damage information B. Likewise, the detection unit 34 detects, by searching through the difference information, a second category point that has only the damage information B or where the damage information B is greater than the damage information A. Furthermore, the detection unit 34 detects, with reference to the difference information, the damage information A, and the damage information B, a third category point that has both the damage information A and the damage information B or where the damage information A and the damage information B are identical to each other.

When the damage information is in the form of quantitative values, the detection unit 34 detects a first category point where the damage information A is quantitatively greater than the damage information B. Likewise, the detection unit 34 detects a second category point where the damage information B is quantitatively greater than the damage information A. Furthermore, the detection unit 34 detects a third category point where the damage information A is quantitatively equal to the damage information B.

Figure 8:
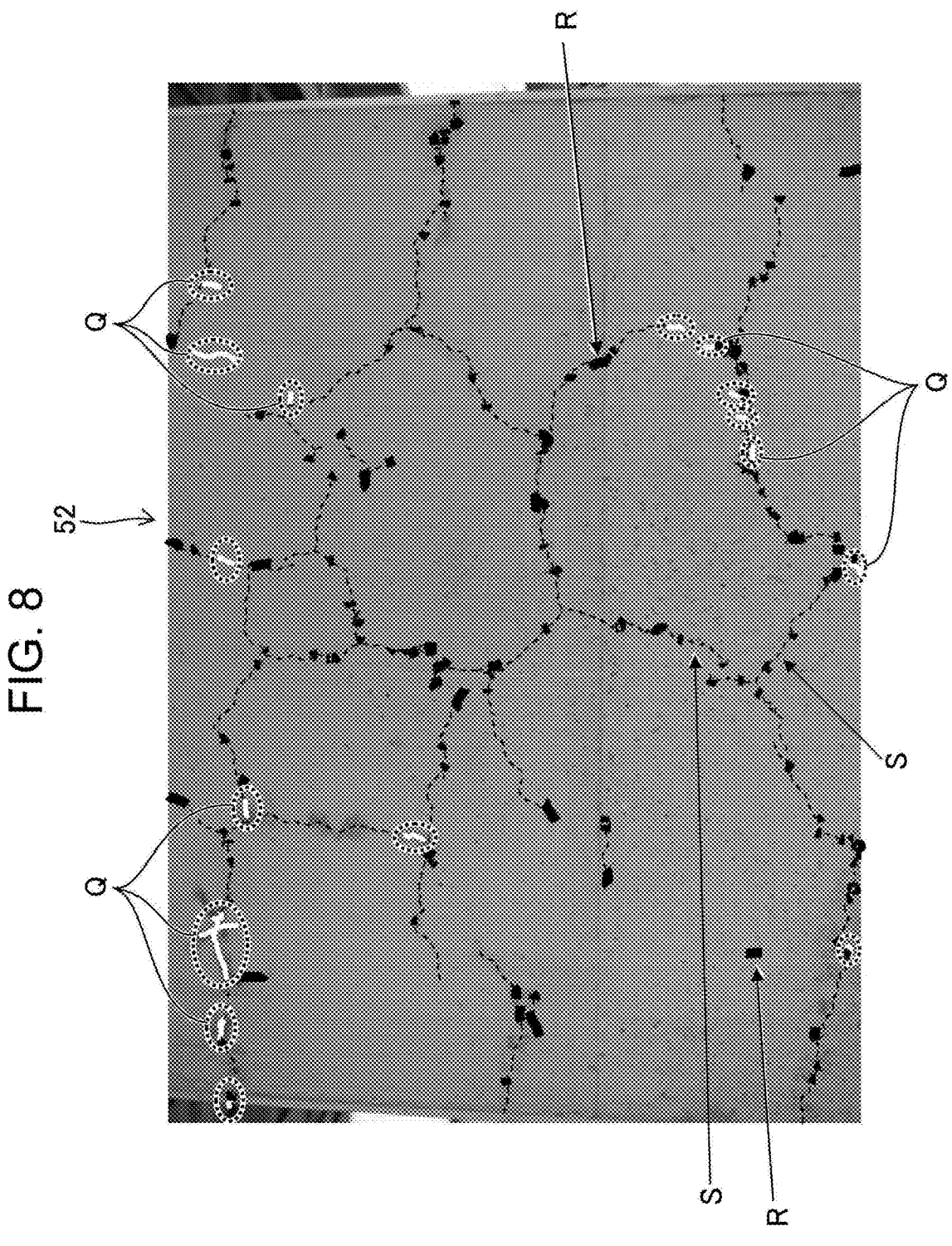
FIG. 8 illustrates an example of difference information.

FIG. 8 illustrates an example of the difference information concerning the difference between the damage information A and the damage information B.

The damage information A and the damage information B are aligned with each other, and the damage information A is then subtracted from the damage information B to obtain the difference, which is hereinafter referred to as difference information 52. The difference information 52 is presented as a damage view created on the basis of the vectorial information obtained by subtracting the damage information A from the damage information B, as well as on the basis of the damage information A and the damage information B. Q in the difference information 52 denotes spots where only the damage information A is involved. The spots Q are enclosed with dotted lines. When the damage information is in the form of quantitative values, Q denotes spots where the damage information A is quantitatively greater than the damage information B. These spots are detected as first category points by the detection unit 34. R in the difference information 52 denotes spots where only the damage information B is involved. The spots R are indicated with solid black lines. When the damage information is in the form of quantitative values, R denotes spots where the damage information B is quantitatively greater than the damage information A. These spots are detected as second category points by the detection unit 34. S in the difference information 52 denotes spots where both the damage information A and the damage information B are involved. The spots S are indicated with dotted lines. When the damage information is in the form of quantitative values, S denotes spots where the damage information A is quantitatively equal to the damage information B. These spots are detected as third category points by the detection unit 34.

As described above, the detection unit 34 detects first category points and second category points by searching through the difference information 52. Furthermore, the detection unit 34 detects third category points with reference to the damage information A, the damage information B, and the difference information 52.

Figure 9:
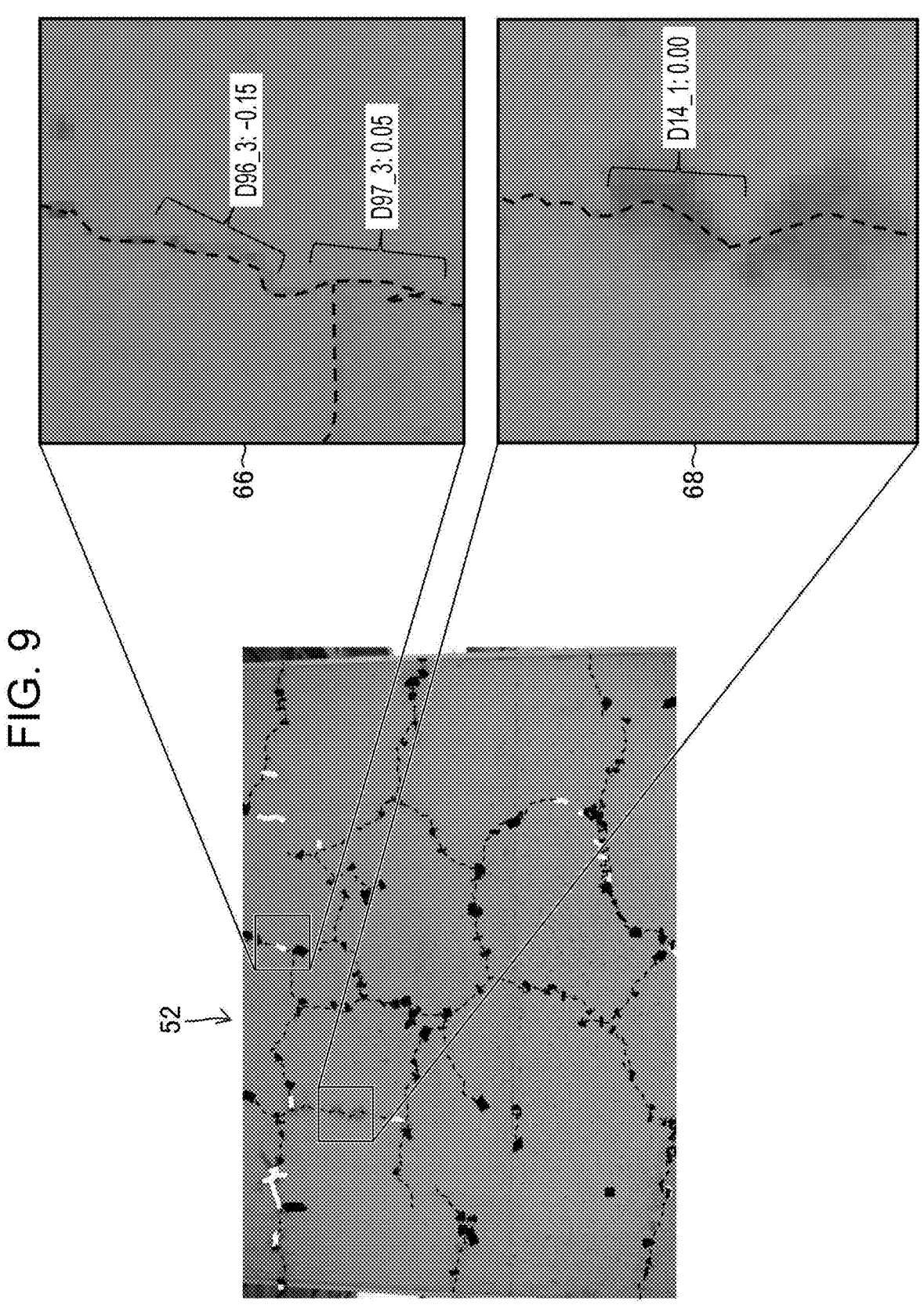
FIG. 9 illustrates an example of difference information (quantitative value)

FIG. 9 illustrates an example of the difference information (quantitative value) concerning the difference between the damage information A and the damage information B.

Categorization based on quantitative values of the widths of cracks in the difference information 52 illustrated in FIG. 8 (categorization for the case in which the damage information is in the form of quantitative values) will be described below with reference to FIG. 9. The difference information in FIG. 9 is indicated as values obtained by subtracting the width of each crack that the damage information A has from the width of the corresponding crack that the damage information B has.

Enlarged views of part of the difference information 52 are denoted by 66 and 68. The value of the difference information about the crack numbered "D96_3" is −0.15, in which case the crack numbered "D96_3" is detected as a first category point by the detection unit 34. The value of the difference information about the crack numbered "D97_3" is 0.05, in which case the crack numbered "D97_3" is detected as a second category point by the detection unit 34. The value of the difference information about the crack numbered "D14_1" is 0.00, in which case the crack numbered "D14_1" is detected as a third category point by the detection unit 34.

That is, the detection unit 34 detects first category points and second category points by searching through the difference information about the widths of cracks. Furthermore, the detection unit 34 detects third category points with reference to the damage information A, the damage information B, and the difference information 52.

As described above, the detection unit 34 searches through the difference information 52 and detects first category points, second category points, and third category points by determining whether the damage information A and/or the damage information B is involved in the point of interest. When the difference information 52 has quantitative values, the detection unit 34 detects first category points, second category points, and third category points by determining the magnitude relationship between the damage information A and the damage information B (i.e., by determining whether either one is greater than the other or they are equal to each other).

Indication Step

The indication step is performed by the indication output unit 36. The indication output unit 36 performs display processing in which the indication output unit 36 provides an alert indication to give an indication of the first category point and outputs the alert indication to the display unit 26 to cause the display unit 26 to display the alert indication. Likewise, the indication output unit 36 performs display processing in which the indication output unit 36 provides an alert indication to give an indication of the second category point and outputs the alert indication to the display unit 26 to cause the display unit 26 to display the alert indication. Furthermore, the indication output unit 36 performs display processing in which the indication output unit 36 provides an alert indication to give an indication of the third category point and outputs the alert indication to the display unit 26 to cause the display unit 26 to display the alert indication.

Figure 10:
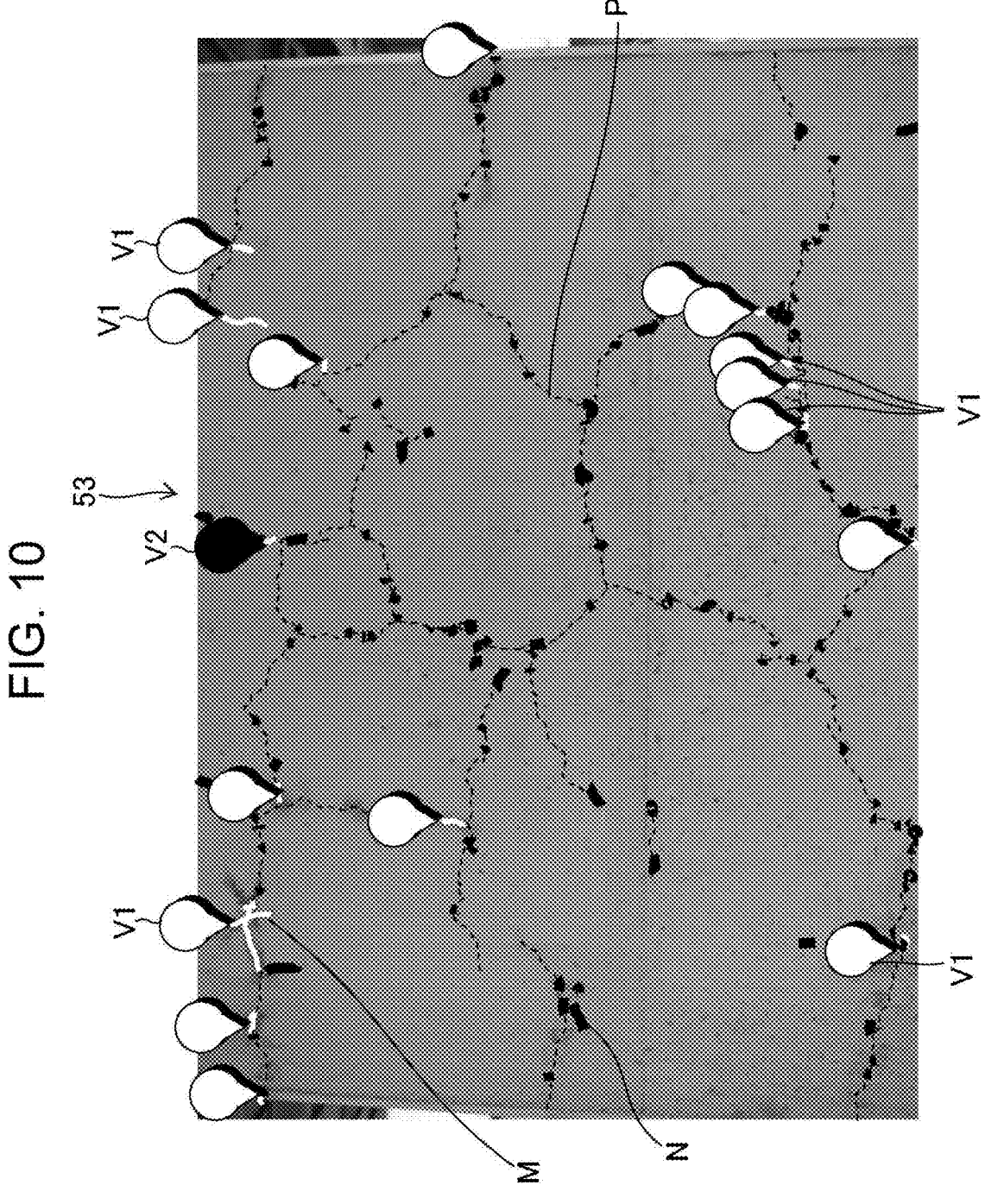
FIG. 10 illustrates an example of a state in which a display image (a damage view and an alert indication) output by an indication output unit is displayed by a display unit.

FIG. 10 illustrates an example of a state in which a display image (a damage view and an alert indication) output by the indication output unit 36 is displayed by the display unit 26.

The display unit 26 displays a damage view 53, which is created on the basis of the damage information A and the damage information B. First category points in the damage view 53 are denoted by solid white lines, which denote an alert indication M. Second category points in the damage view 53 are denoted by solid black lines, which denote an alert indication N. Third category points in the damage view 53 are denoted by dotted lines, which denote an alert indication P. That is, the alert indication given as an indication of the first category points, the alert indication given as an indication of the second category points, and the alert indication given as an indication of the third category points are shown in the damage view 53 displayed by the display unit 26, in which case different colors and/or different kinds of lines are used to distinguish one category from another.

The display unit 26 also marks the first category points with white balloons, which denote an alert indication V1. The alert indication V1 is positioned on the basis of the damage information A detected as the first category points such that the alert indication V1 serves as an indication of the first category points. The display unit 26 marks specific first category points with black balloons, which denote an alert indication V2. More specifically, points where the damage information A has a quantitative value greater than that of the damage information B are denoted by black balloons. That is, the display unit 26 displays markers each having the shape of, for example, a balloon in the damage view 53 to give an indication of the first category points.

As described above, the present embodiment involves the following features. The difference information 52 concerning the difference between the damage information A and the damage information B is extracted, and the difference information 52 is searched for a first category point. Then, an alert indication is provided in connection with at least one of the damage information A or the damage information B to give an indication of the first category point and is displayed by the display unit 26. The user can thus recognize the point that has the difference information that is chronologically unnatural.

The difference information 52 is also searched for a second category point. Then, an alert indication is provided in connection with at least one of the damage information A or the damage information B to give an indication of the second category point and is displayed by the display unit 26. The user can thus recognize the location of an increase in damage or the location of the occurrence of damage.

The difference information 52, the damage information A, and the damage information B also serve as the basis for detecting a third category point. Then, an alert indication is provided in connection with at least one of the damage information A or the damage information B to give an indication of the third category point and is displayed by the display unit 26. The user can thus recognize the point where there has been no change in damage.

First Modification

The following describes a first modification of the above-mentioned embodiment. In this modification, the display unit 26 displays visual imagery 62 and visual imagery 64. The visual imagery 62 is relevant to the damage information A about a region specified by the user. The visual imagery 64 is relevant to the damage information B about the region concerned.

FIGS. 11A and 11B each illustrate an example form of display in the first modification. FIG. 11A illustrates a state in which the damage view 53 is displayed by the display unit 26.

The user specifies a region that is part of the damage view 53 displayed by the display unit 26. The region is denoted by F. Once the region is specified, the indication output unit 36 outputs, to the display unit 26, visual imagery corresponding to the specified region; that is, the indication output unit 36 outputs the visual imagery 62 and the visual imagery 64 to the display unit 26.

FIG. 11B illustrates a state in which the visual imagery 62 and the visual imagery 64 are displayed by the display unit 26.

The visual imagery 62 is an enlarged view of a region corresponding to the region F that is part of the visual imagery 50. The visual imagery 64 is an enlarged view of a region corresponding to the region F that is part of the visual imagery 54. The indication output unit 36 outputs the visual imagery 62 and the visual imagery 64 to the display unit 26. The indication output unit 36 performs display processing in which the indication output unit 36 causes the display unit 26 to display the visual imagery 62 and the visual imagery 64 side by side for comparison (i.e., to provide comparative display). The damage views corresponding to the visual imagery 62 and the visual imagery 64 may be displayed in such a manner that each damage view is superimposed on the corresponding visual imagery.

As described above, the display unit 26 displays the region specified by the user or, more specifically, the visual imagery 62 of the region in the past and the visual imagery 64 of the region at the present time. While observing the subject of inspection, the user can thus compare its state at the present time with its state in the past.

Second Modification

The following describes a second modification of the above-mentioned embodiment. In this modification, instructions about how to make corrections to the first category point are provided to the user.

The damage information (the damage information A or the damage information B) corresponding to the first category point can be corrected in various ways. The indication output unit 36 thus outputs, to the display unit 26, one or more procedures for making corrections. Upon receipt of the procedures for making corrections, the display unit 26 displays the procedures to instruct the user how to make corrections. Concrete examples of the procedures for making corrections are given below.

The damage information corresponding to the first category point can be corrected with consideration given to the date and time of inspection and the temperature at the time of inspection. For example, in view of the fact that the volume of concrete changes with temperature, the damage information in the form of quantitative values (e.g., the widths of cracks) is corrected for the temperature estimated on the basis of the date and time of inspection and/or image features. Alternatively, the user may input the date and time and the temperature to make corrections to the damage information in the form of quantitative values.

In a case where the damage information corresponding to the first category point is generated by a detector adapted by machine learning, corrections can be made to the damage information by changing threshold values or the like.

Figures 12A, 12B:
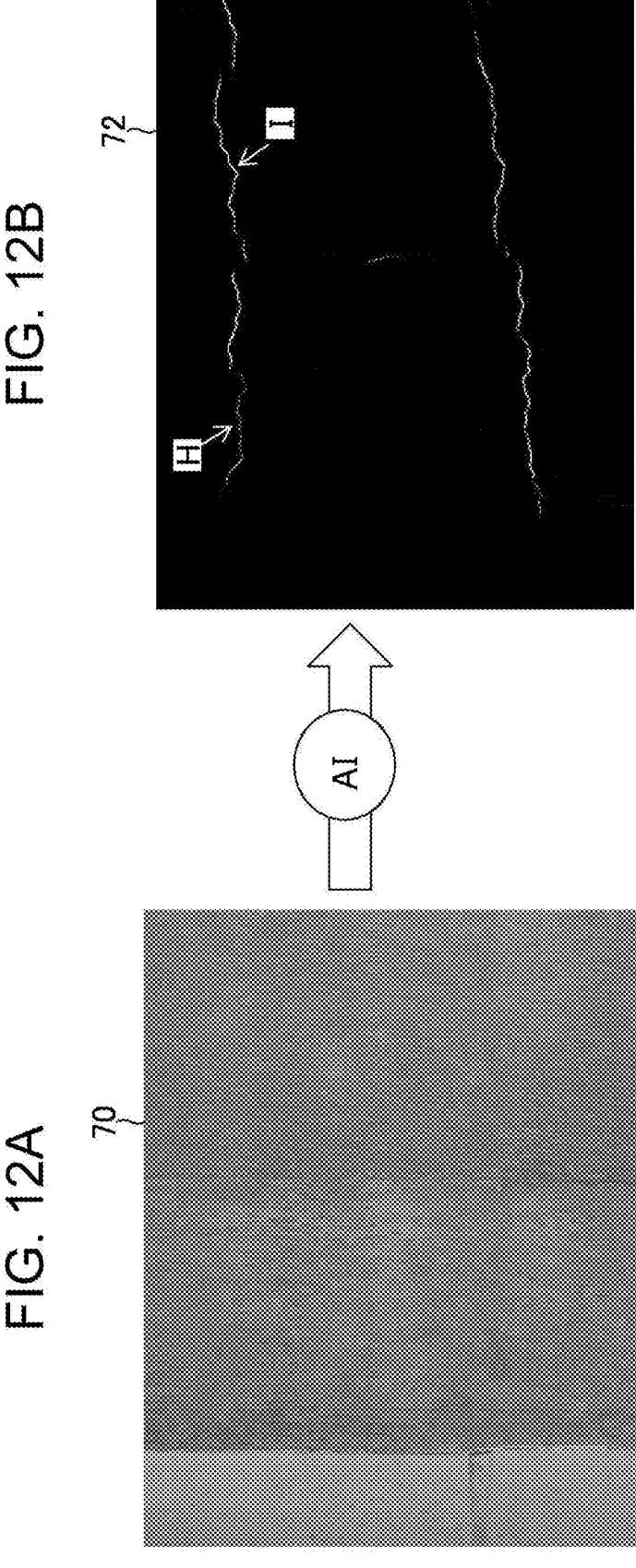
FIG. 12A and 12B illustrate detection of cracks by a detector searching through visual imagery.

FIG. 12A and 12B illustrate the detection of cracks by a detector searching through visual imagery.

FIG. 12A is visual imagery of a subject of inspection. The visual imagery is denoted by 70. The visual imagery 70 is input to a detector (AI) adapted by machine learning. If any crack is seen in the visual imagery 70, the crack is detected by the detector (AI), which then outputs a detection result 72. The probability of being a crack is output by the detector (AI) such that the one or ones whose probability of being a crack is not less than a predetermined threshold value can be detected as damage.

FIG. 12B illustrates the detection result 72 output by the detector (AI). For example, the one or ones whose probability of being a crack is not less than 30% may be detected by the detector (AI), which gives the detection result 72 accordingly. With regard to the detection result 72, a spot with a higher probability of being a crack is indicated with a clear line (denoted by arrow I), and a spot with a lower probability of being a crack is indicated with a faint line (denoted by arrow H). The probability of being a crack is represented by pixel values in the detection result 72.

As a way to make corrections to the first category point where only the damage information A is involved or where the damage information A is greater than the damage information B, the threshold value at which to generate the damage information B is reduced when the detector (AI) redoes the detection of damage. Consequently, the damage associated with the damage information A is also detected in the damage information B, in which case both the damage information A and the damage information B are involved in the point detected as the first category point. In some cases, the quantitative value provided as the damage information B is corrected. In this way, corrections are made to the first category point. As another way to make corrections to the first category point where only the damage information A is involved or where the damage information A is greater than the damage information B, the threshold value at which to generate the damage information A is increased when the detector (AI) redoes the detection of damage. Consequently, neither the damage information A nor the damage information B is involved in the point detected as the first category point. In some cases, the quantitative value provided as the damage information A is corrected. In this way, corrections are made to the first category point.

As described above, the indication output unit 36 outputs, to the display unit 26, one or more procedures for making corrections to the damage information (the damage information A or the damage information B) corresponding to the first category point, and the display unit 26 displays procedures to instruct the user how to make corrections.

Third Modification

The following describes a third modification of the above-mentioned embodiment. In this modification, the user manually makes corrections to the damage information A or the damage information B, and the processing for extracting differences is then performed again. As described above, corrections are made to the damage information (the damage information A or the damage information B) corresponding to the first category point. In this modification, the corrections are made manually by the user.

Figure 13:
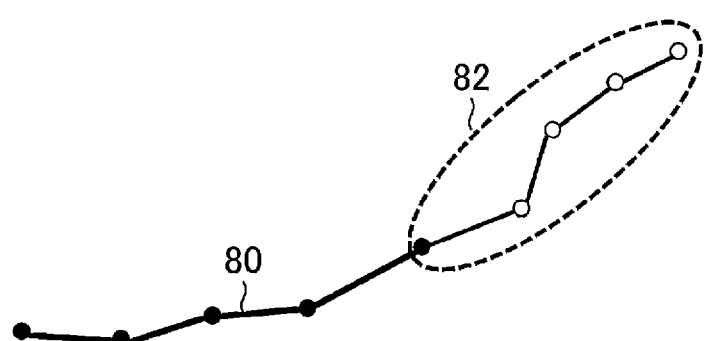
FIG. 13 illustrates an example procedure for accepting corrections made to the damage information.

FIG. 13 illustrates an example procedure for accepting corrections made to the damage information.

When a representation of a crack is displayed as a damage representation 80 by the display unit 26 on the basis of the damage information, the user adds another representation of the crack (a damage representation 82) by using a pointing device. The damage representation 82 added is accepted as correction information by the damage information acquisition unit 30. The damage information acquisition unit 30 then makes corrections to the existing damage information on the basis of the correction information. Subsequently, the difference extraction unit 32 redoes the extraction of difference information.

Figure 14:
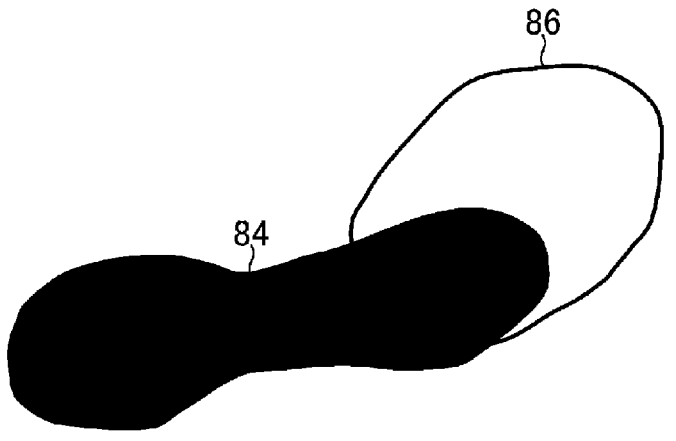
FIG. 14 illustrates another example procedure for accepting corrections made to the damage information.

FIG. 14 illustrates another example procedure for accepting corrections made to the damage information.

When a representation of a damaged region (e.g., peeling) is displayed as a damage representation 84 by the display unit 26 on the basis of the damage information, the user adds another representation of the damaged region (a damage representation 86) by using a pointing device. The damage representation 86 added is accepted as correction information by the damage information acquisition unit 30. The damage information acquisition unit 30 then makes corrections to the existing damage information on the basis of the correction information. Subsequently, the difference extraction unit 32 redoes the extraction of difference information.

As for linear damage such as cracking, the user can make corrections to the damage information by, for example, adding or deleting a trace. As for areal damage such as peeling, the user can make corrections to the damage information by, for example, adding or deleting a region.

As described above, the user manually makes corrections to the damage information. In some embodiments, however, corrections are automatically made to the damage information. For example, the damage information acquisition unit 30 may delete the damage information A involved in a point detected as the first category point or may add damage in the form of the damage information B to a point detected as the first category point. In this way, the damage information is automatically corrected.

Fourth Modification

The following describes a fourth modification of the above-mentioned embodiment. In this modification, the difference information (quantitative value) is reflected in a damage view in various forms in accordance with its magnitude.

Figure 15:
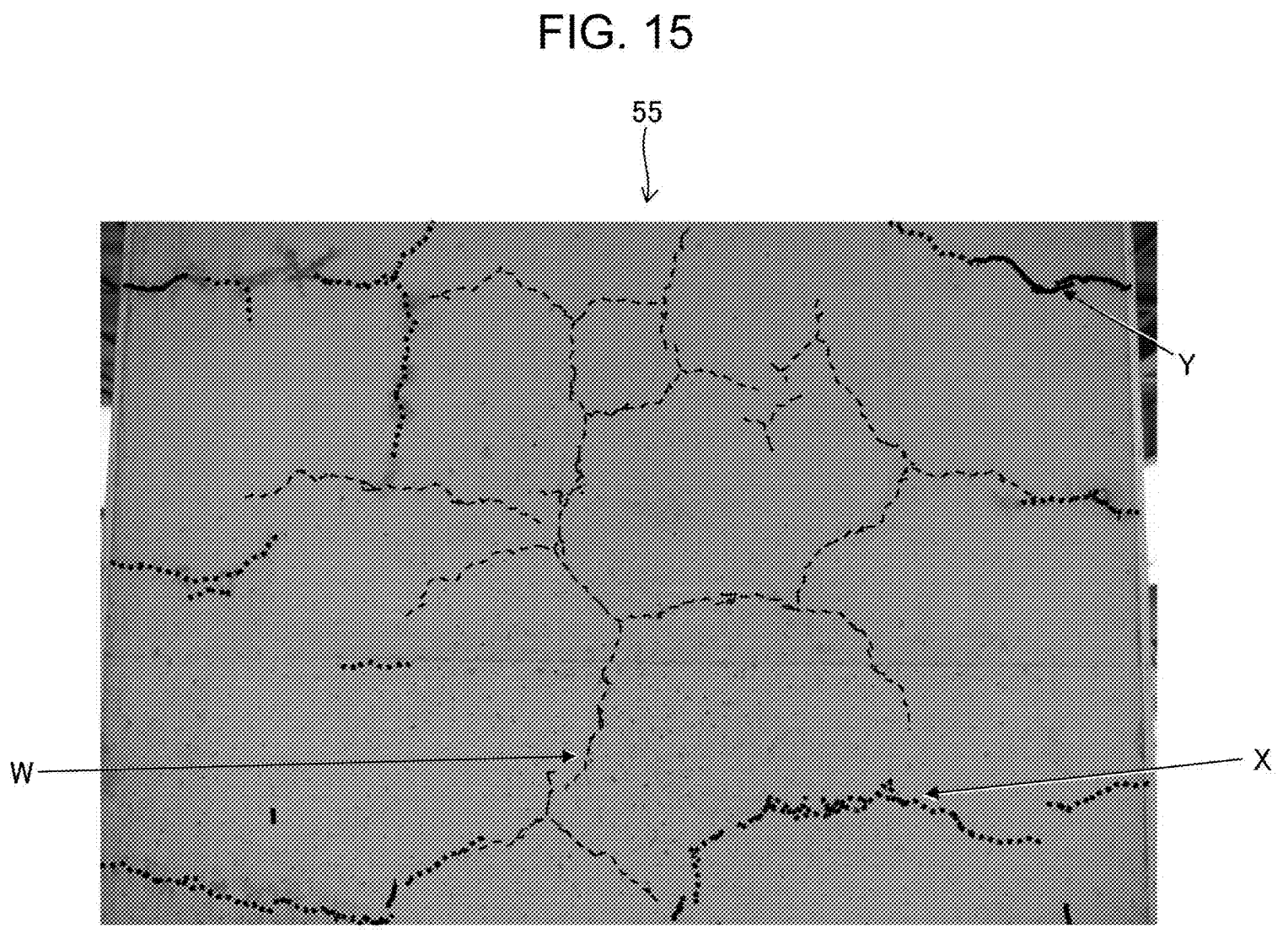

FIG. 15 illustrates a state in which a damage view in this modification is displayed by the display unit 26. The display unit 26 is controlled by the indication output unit 36 such that the display unit 26 displays a display image output by the indication output unit 36.

A damage view 55 is created on the basis of damage information corresponding to the second category point. As damage representations of cracks, different types of lines are used to reflect, in the damage view 55, the magnitude of the difference in the quantitative values provided as the difference information (the widths of the cracks).

The damage representation denoted by arrow W corresponds to difference information indicative of a great increase in the width of a crack. The damage representation concerned is indicated with a thin dotted line. The damage representation denoted by arrow X corresponds to difference information indicative of a moderate increase in the width of a crack. The damage representation concerned is indicated with a thick dotted line. The damage representation denoted by arrow Y corresponds to difference information indicative of a small increase in the width of a crack. The damage information concerned is indicated with a solid line.

When the quantitative values provided as the difference information are indicated in various forms in accordance with magnitude, the user can be informed about a danger-prone area where there is an increase in damage.

Variation on Fifth Modification

The following describes a variation on the fifth modification of the above-mentioned embodiment. This variation involves switching control for switching between displaying and hiding damage representations of first category points, damage representations of second category points, and damage representations of third category points.

Figure 16B:
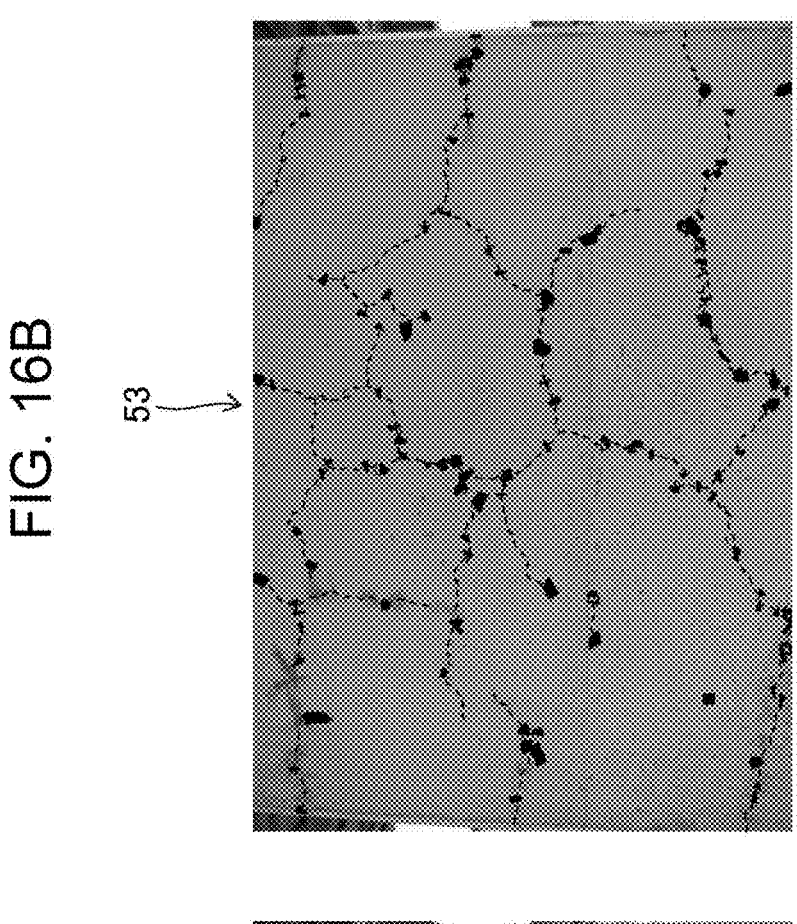
FIG. 16A and 16B illustrate the switching between displaying and hiding damage representations.
Figure 16A:
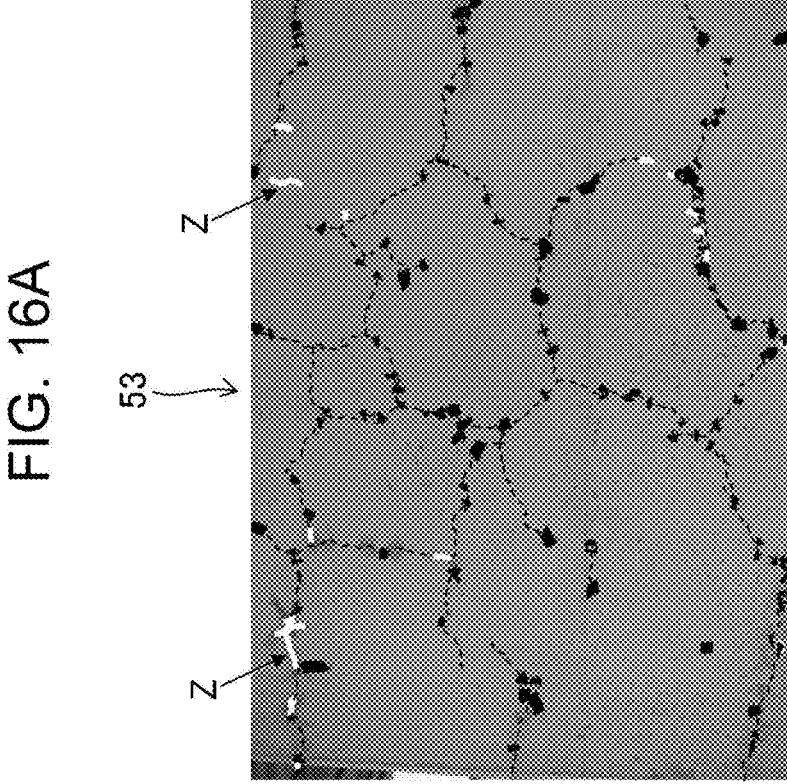

FIGS. 16A and 16B illustrate how the switching between displaying and hiding damage representations of the first category points takes place in the display unit 26. The display unit 26 is controlled by the indication output unit 36 such that the display unit 26 displays a display image output by the indication output unit 36.

FIG. 16A illustrates a state in which the damage view 53 is displayed by the display unit 26. All the damage representations created on the basis of the damage information corresponding to the first category points, the damage information corresponding to the second category points, and the damage information corresponding to the third category points are indicated in the damage view 53. The damage representations of the first category points are indicated with white lines (denoted by arrows Z).

FIG. 16B illustrates a state in which the damage view 53 is displayed in such a manner that the damage representations (arrows Z) of the first category points are hidden from view. The indication output unit 36 performs display processing in which the indication output unit 36 hides the first category points in a display image and outputs the resultant display image to the display unit 26 to cause the display unit 26 to display the display image.

When the display unit 26 is controlled in relation to displaying and hiding the damage representations of the first category points, the damage representations of the second category points, or the damage representations of the third category points, the user can see damage representations of interest.

Other Particulars

In terms of hardware configuration, a variety of processors may serve as processing units that perform various kinds of processing in the embodiment described above. Examples of the variety of processors include: a central processing unit (CPU) that is a general-purpose processor capable of running software (i.e., executing programs) to serve as various processing units; a programmable logic device (PLD) such as a field-programmable gate array (FPGA) in which circuit configuration can be changed after manufacture; and a purpose-built electric circuit such as an application-specific integrated circuit (ASIC) that is a processor having circuit configuration tailored to specific processing.

Each processing unit may be one of the variety of processors mentioned above or may be a combination of two or more processors of the same type (e.g., a combination of FPGAs) or a combination of two or more processors of dissimilar types (e.g., a combination of a CPU and an FPGA). One processor may serve as two or more processing units. For example, one or more CPUs and software may be combined into one processor that serves as two or more processing units. Computers such as a client and a server are typical examples of the processor serving as two or more processing units. Alternatively, the function of a system including two or more processing units may be entirely implemented by a single integrated circuit (IC) chip. A system-on-chip (SoC) is a typical example of such a processor. In terms of hardware configuration, each processing unit is implemented by one or more of the variety of processors mentioned above.

In terms of hardware configuration, the variety of processors is more specifically regarded as electric circuitry that is a combination of circuit elements such as semiconductor elements.

The above-mentioned configurations and functions can each be implemented appropriately by desired hardware, desired software, or a combination of both. For example, the present invention is applicable to the following: a program causing a computer to perform the above-mentioned processing steps (processing procedure); a computer-readable recording medium (non-transitory recording medium) on which such a program is recorded; or a computer on which such a program can be installed.

The present invention has been described by way of example. Needless to say, various alterations and modifications may be made within a range not departing from the spirit of the present invention.

REFERENCE SIGNS LIST

10 damage information processing device
12 data acquisition unit
16 memory
18 operating unit
20 CPU
22 RAM
24 ROM
26 display unit
30 damage information acquisition unit
32 difference extraction unit
34 detection unit
36 indication output unit

What is claimed is:

1. A damage information processing device comprising a processor and configured to process information about damage to a structure, the processor being configured to:

acquire information about damage to a structure, the information including first damage information about a state at one point in time and second damage information about a state at a later point in time than the first damage information;

extract difference information concerning difference between the first damage information and the second damage information, the difference information being a quantitative value;

detect, by searching through the difference information, a first category point where only the first damage information is involved or where the first damage information is greater than the second damage information; and output, to a display device, an alert indication in connection with at least one of the first damage information or the second damage information to give an indication of a location of the first category point, wherein the first category point indicates a chronologically unnatural change that conflicts with a chronologically irreversible transformation.

2. The damage information processing device according to claim 1, wherein the processor detects, by searching through the difference information, a second category point where only the second damage information is involved or where the second damage information is greater than the first damage information, and the processor outputs, to the display device, an alert indication in connection with at least one of the first damage information or the second damage information to give an indication of the second category point.

3. The damage information processing device according to claim 2, wherein with reference to the difference information, the first damage information, and the second damage information, the processor detects a third category point where the first damage information and the second damage information overlap each other or where the first damage information and the second damage information are identical to each other, and the processor outputs, to the display device, an alert indication in connection with at least one of the first damage information or the second damage information to give an indication of the third category point.

4. The damage information processing device according to claim 3, wherein the processor causes the display device to switch between displaying and hiding an indication associated with damage information corresponding to the first category point, an indication associated with damage information corresponding to the second category point, or an indication associated with damage information corresponding to the third category point.

5. The damage information processing device according to claim 2, wherein the processor indicates the second category point in various forms in accordance with magnitude of difference included in the difference information.

6. The damage information processing device according to claim 1, wherein the processor performs display processing in which the processor causes the display device to display an indication associated with information obtained by superposing the first damage information and the second damage information.

7. The damage information processing device according to claim 1, wherein the processor acquires first visual imagery from which the first damage information is obtained and second visual imagery from which the second damage information is obtained, and the processor performs display processing in which the processor causes the display device to display the first visual imagery and the second visual imagery side by side.

8. The damage information processing device according to claim 7, wherein when the first visual imagery or the second visual imagery does not meet a predetermined requirement, the processor performs display processing in which the processor causes the display device to display an indication prompting a user to reacquire visual imagery.

9. The damage information processing device according to claim 1, wherein the processor outputs, to the display device, one or more procedures for making corrections to the first damage information corresponding to the first category point or for making corrections to the second damage information corresponding to the first category point.

10. The damage information processing device according to claim 1, wherein the processor accepts correction information concerning corrections made to the first damage information or the second damage information displayed by the display device, and the processor extracts the difference information again with reference to the first damage information or the second damage information to which the corrections are made.

11. The damage information processing device according to claim 1, wherein the processor automatically makes corrections to the first damage information corresponding to the first category point or to the second damage information corresponding to the first category point.

12. The damage information processing device according to claim 1, wherein the difference information is vectorial information, a length, and/or a width.

13. A damage information processing method by which a damage information processing device comprising a processor processes information about damage to a structure, the method comprising the steps of:

causing the processor to acquire information about damage to a structure, the information including first damage information about a state at one point in time and second damage information about a state at a later point in time than the first damage information;

causing the processor to extract difference information concerning difference between the first damage information and the second damage information, the difference information being a quantitative value;

causing the processor to detect, by searching through the difference information, a first category point where only the first damage information is involved or where the first damage information is greater than the second damage information; and causing the processor to output, to a display device, an alert indication in connection with at least one of the first damage information or the second damage information to give an indication of a location of the first category point, wherein the first category point indicates a chronologically unnatural change that conflicts with a chronologically irreversible transformation.

14. A non-transitory, computer-readable tangible recording medium on which a program for causing, when read by a computer, the computer to execute the damage information processing method according to claim 13 is recorded.

* * * * *